United States Patent [19]

Adam

[11] Patent Number: 5,472,475
[45] Date of Patent: Dec. 5, 1995

[54] ARTIFICIAL SOIL FROM RECYCLED MATERIALS

[76] Inventor: Paul T. Adam, 230 Logan Ave., State College, Pa. 16801

[21] Appl. No.: 232,311

[22] Filed: Apr. 25, 1994

Related U.S. Application Data

[63] Continuation-in-part of Ser. No. 18,267, Feb. 16, 1993, abandoned.

[51] Int. Cl.$^6$ ................................ C05F 7/00; C05F 9/00; C05F 11/02
[52] U.S. Cl. ........................ 711/13; 71/15; 71/24; 71/25; 71/903; 71/904; 47/4; 405/258
[58] Field of Search .................................. 71/11, 13, 15, 71/23, 24, 25, 27, 903, 904; 405/258; 47/9

[56] References Cited

U.S. PATENT DOCUMENTS

| | | | |
|---|---|---|---|
| 3,269,824 | 8/1966 | Aswell | 71/25 |
| 5,145,285 | 9/1992 | Fox et al. | 405/258 |
| 5,153,316 | 10/1992 | Crouse et al. | 540/451 |

*Primary Examiner*—Ferris Lander
*Attorney, Agent, or Firm*—Morgan & Finnegan

[57] ABSTRACT

To make an artificial topsoil combine by hand or in a blending machine, by volume, either dredged river silt, sand or basalt, and cellulose from recycled paper or yard waste, with composted animal or human waste for general reclamation and cereal crops, or vegetable or fruit residuals for gardens or potting soil, and then add calcium in the form of calcium silicate as slag or lime and ammonium nitrate or sulfate mixed with water, and then charcoal or equivalent amount of phosphorus, sodium, and sulfur as are present in charcoal. This combination of material replicates the calcium base, decaying cellulose, silt and animal or vegetable waste structure of natural soils.

Various soil types can be duplicated by adjusting the base content of sand, silt, or basalt and rearranging the nutrient and mineral content to compensate for differing levels of each, for example: calcium and organic percentages should be increased to maximum when using sand as a base. Calcium should be decreased to the minimum percentage when using silt or basalt as a base. Rhyolite should also be added when available to compliment basalt. These elements can be combined to match local soil profiles, and then add seeds are that are appropriate to yield the areas naturally occurring foliage or crop preference.

8 Claims, No Drawings

ARTIFICIAL SOIL FROM RECYCLED MATERIALS

This application is a continuation in part of application Ser. No. 08/018,267 previously filed by me on Feb. 16, 1993, for the purpose of twice amending the claim and the addition of one new element to the composition of matter, specifically charcoal or equal amounts of phosphorus, sodium, and sulfur as are present in charcoal, and now abandoned.

BACKGROUND OF THE INVENTION

1. Field of the Invention

The present invention is a method of preparing artificial soil. As is generally understood, topsoil erosion due to deforestation and poor soil management by farmers along with natural desertification is the root cause of many of our major environmental problems. It is therefore my intention to treat the cause rather than the effect by creating an artificial soil to replace the lost natural soil. Basically, our soils are washed from deforested mountainsides and leached from our crop fields and channeled into streams and rivers. It is my intention to take advantage of silt and sand dredging processes already in operation and to begin mining basalt, and to transport recovered material to factories to be processed into artificial soil. Then the product can be shipped to retail outlets, landscapers, fields, forests, and mountainsides for reclamation. Artificial soil would also be practical for use as potting soil, in greenhouses, nurseries, gardens, and for use in creating artificial environments in the space program.

2. Description of Prior Art

In the past there have been proposals for an artificial soil, two examples currently hold patents in the United States. In my opinion these proposals for an artificial soil are impractical for widespread use due to expensive, lengthy, and complicated manufacturing processes. My invention solves these problems by using inexpensive existing technology, recycled materials, and simple manufacturing techniques. In one case, U.S. Pat. No. 4,501,604, long periods of time and several locations are required. Whereas in my invention the ingredients can be mixed by hand or blending and bagging equipment at one location in less than one hour.

SUMMARY OF THE INVENTION

The object of the invention is to produce an artificial soil from well known and easily obtainable substances. The loss of topsoil is a critical issue for the future of our national and global economies. By restoring lost topsoil we can help prevent and treat erosion due to deforestation, and apply a new soil base for the silviculture industry, both private and public. This technology can be applied in low-tech scenarios as well as to state-of-the-art blending and bagging operations. To make an artificial topsoil combine by hand or in a blending machine, by volume, either dredged river silt, sand or basalt, and cellulose from recycled paper or yard waste, with composted animal or human waste for general reclamation and cereal crops, or vegetable or fruit residuals for gardens or potting soil, and then add calcium in the form of calcium silicate as slag or lime and ammonium nitrate or sulfate mixed with water, and the charcoal or equivalent amount of phosphorus, sodium and sulfur as are present in charcoal. This combination of material replicates the calcium base, decaying cellulose, silt and animal or vegetable waste structure of natural soils.

Various soil types can be duplicated by adjusting the base content of sand, silt, or basalt and rearranging the nutrient and mineral content to compensate for differing levels of each, for example: calcium and organic percentages should be increased to maximum when using sand as a base. Calcium should be decreased to the minimum percentage when using silt or basalt as a base. Rhyolite should also be added when available to complement basalt. These elements can be combined to match local soil profiles, and then add seeds that are appropriate to yield the areas naturally occurring foliage or crop preference.

DETAILED DESCRIPTION OF THE PREFERRED EMBODIMENTS

Because of the shallow root structures of most cash crops, it is only necessary to replace the "A" or humus layer in order to revive a dead field. This layer consists of approximately one foot of dead plant cellulose, animal waste and river silt, sand, or basalt, which when combined make up the structure of natural soil profiles.

I have invented a process using recycled material that is more efficient than older ideas. To make an artificial soil of silt, sand, or basalt base, combine 30 to 60 percent, by volume, river silt, sand, or basalt and 30 to 60 percent cellulose from recycled paper or yard waste with 10 to 20 percent vegetable or fruit residuals or lime treated or composted animal or human waste. Then, add 5 to 10 percent calcium in the form of calcium silicate as slag, or agricultural lime, and 0.5 to 1 percent ammonium nitrate or sulfate mixed with water, and 1 percent charcoal or equivalent amounts of phosphorus, sodium, and sulfur as are present in charcoal. Calcium and organic percentages should be increased to maximum when using sand as a base. The calcium percentage should be decreased to minimum when using silt or basalt as a base. Rhyolite should be added to replace up to 50 percent of the basalt percentage when available to compliment the nutrient profile.

The mixture can be manufactured by hand in a bucket, barrel, or cement mixer. The dry ingredients except nitrate being mixed first and then nitrate mixed with water added until the mixture aquires a suitable texture. In the factory situation, it can be mixed with standard blending and bagging equipment. After seeds have been added, (if desired) the product can be bagged for sale as potting soil or sent by truck or train for delivery as topsoil for landscapers, gardens, greenhouses, nurseries, reclamation, for use in the space program as a topsoil in creating artificial environments and terra forming, or any situation in which topsoil is needed.

The Exact Percentages by weight and volume I used to blend a prototype mixture.

| (allow some variation due to different methods of mixing) | | |
| --- | --- | --- |
| Ingredients | Volume | Weight |
| Silt | 30.17 | 71.36 |
| Paper | 58.63 | 14.70 |
| Residuals | 7.24 | 2.59 |
| Lime | 3.88 | 11.23 |
| A nitrate | 0.074 | 0.1 |
| Charcoal | 0.01 | 0.1 |

I claim:

1. An artificial soil which duplicates natural soil said artificial soil comprising a homogeneous mixture of the following substances, in which the percentage range by volume of said substances is:

| | |
|---|---|
| 30–60% | silt; |
| 30–60% | recycled paper or yard waste; |
| 10–20% | bio-solids selected from the group consisting of composted or lime treated animal or municipal waste or fruit or vegetable residuals; |
| 5–10% | calcium; |
| 1–5% | charcoal, |
| 0.50–1% | ammonium nitrate. |

2. The combination as claimed in claim 1 in which silt may be replaced from a group consisting of sand or basalt.

3. The combination as claimed in claim 2 in which the calcium may be selected from the group consisting of calcium silicate as slag and calcium as agricultural grade lime.

4. The combination as claimed in claim 3 in which the charcoal may be replaced from the group consisting of an equivalent amount of sodium, potassium, and sulfur as are present in charcoal.

5. The combination as claimed in claim 4 in which ammonium nitrate may be replaced by ammonium sulfate.

6. The combination as claimed in claim 1 comprising a homogeneous combination by volume percentage of the following substances:

| | |
|---|---|
| silt | 30.17%; |
| recycled paper | 58.63%; |
| bio-solids | 7.24%; |
| calcium | 3.88%; |
| charcoal | 1.00%, |
| ammonium nitrate | 0.74%. |

7. A process for making an artificial soil comprising the steps of:

(a) combining the volume percentages of the following substances,

| | |
|---|---|
| 30–60% | silt, or sand, or basalt, |
| 30–60% | recycled paper, or yard waste, |
| 10–20% | bio-solids selected from the group consisting of composted or lime treated animal or municipal waste or fruit or vegetable residuals, |
| 5–10% | calcium, |
| 1–5% | charcoal, |
| 0.50–.1% | ammonium nitrate, or sulfate; |

(b) grinding the above substances until a homogeneous mixture is obtained;

(c) transporting said artificial soil to a growing environment.

8. The process as claimed in claim 7 in which the percentages by volume of said combined substances are;

| | |
|---|---|
| silt | 30.17%; |
| recycled paper | 58.63%; |
| bio-solids | 7.24%; |
| calcium | 3.88%; |
| charcoal | 1.00%, |
| ammonium nitrate | 0.74%. |

\* \* \* \* \*